3,256,341
EXTRACTION OF 1,2,3,4-TETRAHYDRO-NAPHTHALENE HYDROPEROXIDE
George L. O'Connor, Charleston, Paul A. Munday, Nitro, and David W. Peck, Charleston, W. Va., assignors to Union Carbide Corporation, a corporation of New York
Filed Dec. 2, 1960, Ser. No. 73,218
3 Claims. (Cl. 260—610)

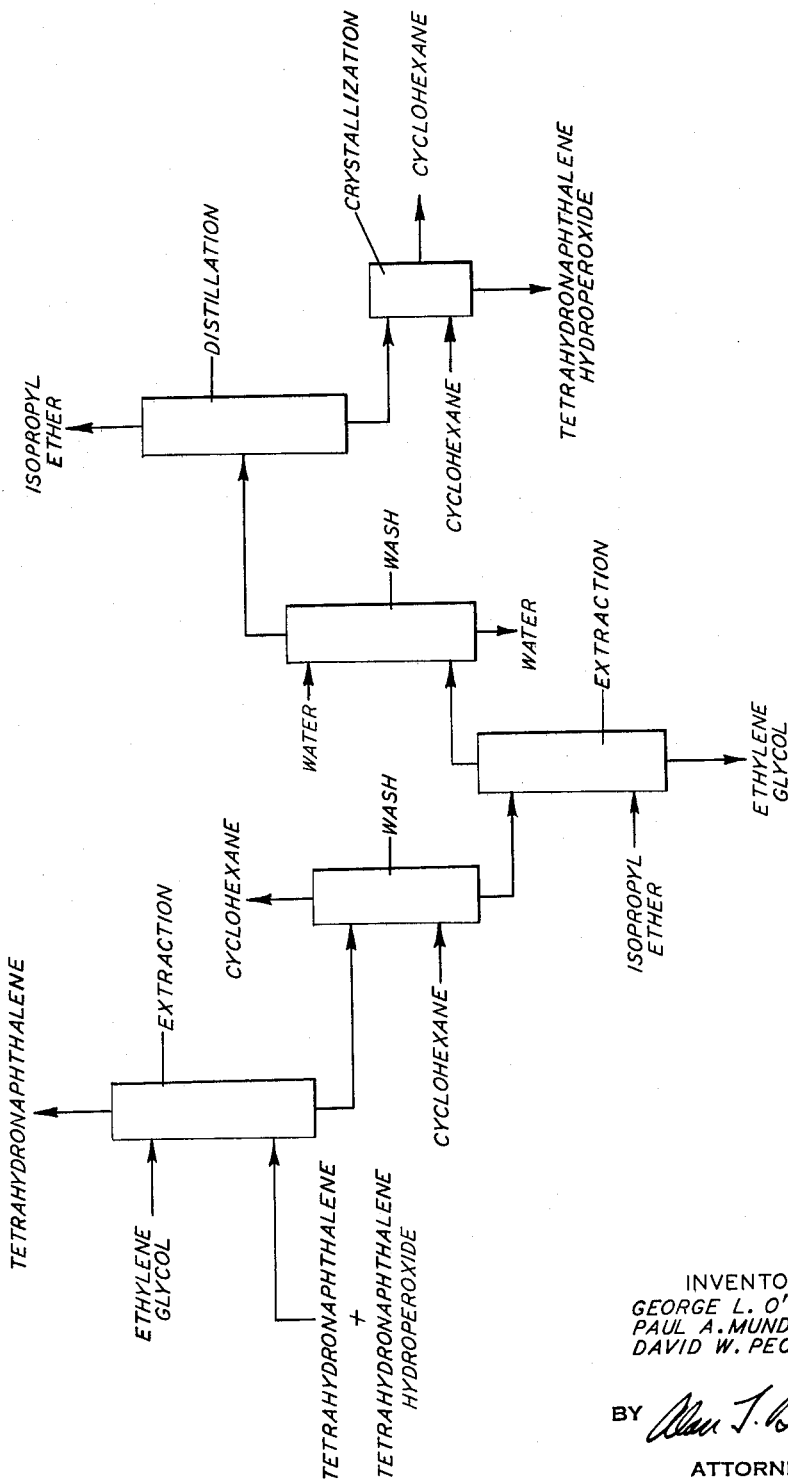

The instant invention relates to a process for purifying 1,2,3,4-tetrahydronaphthalene hydroperoxide. More particularly, this invention relates to a process for separating 1,2,3,4 - tetrahydronaphthalene hydroperoxide from a mixture of 1,2,3,4-tetrahydronaphthalene and 1,2,3,4-tetrahydronaphthalene hydroperoxide.

1,2,3,4-tetrahydronaphthalene hydroperoxide can be represented by the following structural formula:

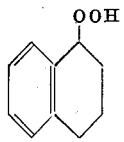

This compound is useful as a chemical intermediate and as an initiator for polymerizations and radical type reactions.

1,2,3,4-tetrahydronaphthalene hydroperoxide can be prepared by the oxidation of 1,2,3,4-tetrahydronaphthalene as is illustrated by the following equation:

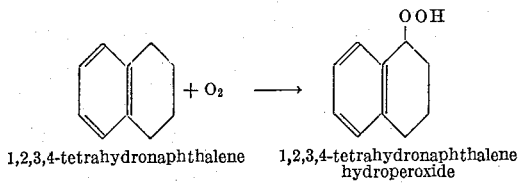

1,2,3,4-tetrahydronaphthalene    1,2,3,4-tetrahydronaphthalene hydroperoxide

The yield of 1,2,3,4-tetrahydronaphthalene hydroperoxide achieved by this process, as it is presently practiced, is generally about 10 percent, based upon 1,2,3,4-tetrahydronaphthalene. As a result, the 1,2,3,4-tetrahydronaphthalene hydroperoxide must be separated from a large amount of unconverted 1,2,3,4-tetrahydronaphthalene. This separation has been accomplished in the past by distillation or by chemical extraction of the 1,2,3,4-tetrahydronaphthalene hydroperoxide as the sodium salt. Both of these processes are unsatisfactory, however; the distillation because of the instability of 1,2,3,4-tetrahydronaphthalene hydroperoxide at the high temperatures required to effect the separation, and the chemical extraction because it is expensive.

It has now been discovered that an economical recovery of 1,2,3,4-tetrahydronaphthalene hydroperoxide from 1,2,3,4 - tetrahydronaphthalene-1,2,3,4-tetrahydronaphthalene hydroperoxide mixtures can be effected by an improved solvent extraction process. The process of this invention essentially comprises extracting 1,2,3,4-tetrahydronaphthalene hydroperoxide from a mixture of 1,2,3,4 - tetrahydronaphthalene and 1,2,3,4 - tetrahydronaphthalene hydroperoxide with a glycol, separating the 1,2,3,4-tetrahydronaphthalene raffinate and the glycol extract, extracting the 1,2,3,4-tetrahydronaphthalene hydroperoxide from the glycol extract with an ether, separating the glycol raffinate and the ether extract and recovering 1,2,3,4,-tetrahydronaphthalene hydroperoxide from the ether extract by evaporating off the ether.

The first step of the process of this invention is the extraction of 1,2,3,4-tetrahydronaphthalene hydroperoxide from the 1,2,3,4-tetrahydronaphthalene-1,2,3,4-tetrahydronaphthalene hydroperoxide mixture employing as a solvent a glycol selected from the group consisting of ethylene glycol, propylene glycol and diethylene glycol. The preferred solvent is ethylene glycol because it is a more specific solvent for 1,2,3,4-tetrahydronaphthalene hydroperoxide than the others.

This step is conducted by contacting a solution of 1,2,3,4 - tetrahydronaphthalene and 1,2,3,4 - tetrahydronaphthalene hydroperoxide with the glycol in the volume ratio of glycol to 1,2,3,4-tetrahydronaphthalene-1,2,3,4-tetrahydronaphthalene hydroperoxide solution of from about 0.5:1.0 to about 2.0:1.0 respectively, whereby two phases are formed. The 1,2,3,4-tetrahydronaphthalene hydroperoxide, being more soluble in the glycol phase than in the 1,2,3,4-tetrahydronaphthalene phase, is transferred to the glycol phase. The resultant glycol and 1,2,3,4-tetrahydronaphthalene phases are separated.

This extraction can be conducted either batchwise or continuously, employing conventional extraction apparatus and procedures. For example, mixers such as mechanical mixers, flow mixers, column mixers and pumps as well as continuous counter current columns, such as wetted-wall columns, spray columns, packed columns, sieve or perforated plate columns, modified bubble plate columns, baffled columns and columns having internal agitators can all be employed in the process of this invention.

The second step of the process of this invention comprises contacting the glycol extract, containing 1,2,3,4-tetrahydronaphthalene hydroperoxide, with an ether whereby two phases are formed. The 1,2,3,4-tetrahydronaphthalene hydroperoxide is transferred from the glycol phase to the ether phase. The volume ratio of ether to glycol extract employed in this step is from about 0.5:1.0 to about 2.0:1.0. This extraction is effected in a manner similar to that employed in extracting the 1,2,3,4-tetrahydronaphthalene-1,2,3,4-tetrahydronaphthalene hydroperoxide mixture with the glycol.

Ethers that can be used in this step have the general formula:

$$R_2O$$ 

wherein R is an alkyl radical having from about 2 to about 4 carbon atoms. Examples of applicable ethers include ethyl ether, isopropyl ether, n-propyl ether, n-butyl ether and the like. Isopropyl ether is preferred, however, because it is a more specific solvent for the 1,2,3,4 - tetrahydronaphthalene hydroperoxide than the other ethers.

The resultant ether extract and glycol raffinate are then separated and the ether is evaporated off from the ether extract, leaving a residue of 1,2,3,4-tetrahydronaphthalene hydroperoxide. The evaporation is preferably conducted at pressures of from about 760 millimeters of mercury to about 10 millimeters of mercury, maintaining kettle temperatures of less than 65° C. to prevent decomposition of 1,2,3,4-tetrahydronaphthalene hydroperoxide.

The 1,2,3,4-tetrahydronaphthalene hydroperoxide recovered by the above-described process is generally an oily residue containing from about 50 to about 75 percent of 1,2,3,4-tetrahydronaphthalene hydroperoxide that is contaminated with 1,2,3,4-tetrahydronaphthalene glycol and ether. Accordingly, where a pure product is desired, additional purification steps may be employed after each of the above-described steps.

The glycol extract separated from the 1,2,3,4-tetrahydronaphthalene phase in the first step is contaminated with 1,2,3,4-tetrahydronaphthalene which can be removed from the glycol extract by washing said extract with a hydrocarbon solvent for the 1,2,3,4-tetrahydronaphthalene. Applicable solvents are aliphatic and cycloaliphatic hydrocarbon compounds having from about five to about eight carbon atoms. Such solvents include n-pentane, n- hexane, cyclohexane, n-heptane, octane, methylcyclohexane and the like. The preferred solvent is cyclohexane. The 1,2,3,4-tetrahydronaphthalene can be separated from the organic solvent by conventional distillation procedures. The 1,2,3,4-tetrahydronaphthalene-free glycol extract is then contacted with an ether as previously outlined.

The ether extract obtained from the ether-glycol extraction is contaminated with some glycol. It is therefore preferred to wash the ether extract with water to remove the glycol prior to evaporating off the ether to recover the 1,2,3,4-tetrahydronaphthalene hydroperoxide. The glycol and water can be separated by employing known distillation procedures.

Finally, the 1,2,3,4-tetrahydronaphthalene hydroperoxide is generally recovered as an oily residue that remains after the evaporation of the ether. This residue can be purified by recrystallization from an aliphatic or cycloaliphatic organic solvent having from about six to about eight carbon atoms. Applicable solvents include, n-hexane, cyclohexane, n-heptane, octane, methylcyclohexane and the like. The preferred solvent is cyclohexane. The crystals of 1,2,3,4-tetrahydronaphthalene hydroperoxide that form can be recovered from the mother liquor by conventional methods, such as by filtration, centrifugation and drying.

A flow sheet of the process is shown in the drawing.

A preferred embodiment of the process of this invention comprises contacting a 1,2,3,4-tetrahydronaphthalene-1,2,3,4-tetrahydronaphthalene hydroperoxide mixture with ethylene glycol, separating the 1,2,3,4-tetrahydronaphthalene raffinate and the ethylene glycol extract, washing said glycol extract with cyclohexane and extracting the resulting substantially 1,2,3,4-tetrahydronaphthalene-free glycol extract with isopropyl ether, separating the ether extract from the glycol raffinate, washing said ether extract with water, stripping off the isopropyl ether from the resulting substantially glycol-free ether extract, dissolving the resultant residue in cyclohexane, at a temperature of about 65° C., cooling the solution to ambient temperature or lower and recovering the resulting crystals of 1,2,3,4-tetrahydronaphthalene hydroperoxide by filtration and drying.

The following examples are illustrative of the process of this invention.

*Example I*

1,2,3,4 - tetrahydronaphthalene hydroperoxide was extracted from a mixture of 10 grams of 1,2,3,4-tetrahydronaphthalene hydroperoxide in 40 grams of 1,2,3,4-tetrahydronaphthalene by contacting said mixture with three 50-gram portions of ethylene glycol in a separatory funnel. The resulting ethylene glycol extracts were blended and extracted in a similar manner with two 100-gram portions of n-hexane. 1,2,3,4-tetrahydronaphthalene hydroperoxide was extracted from the glycol raffinate with four 100-gram portions of isopropyl ether. Ethylene glycol was then extracted from the ether extract with four 200-cc. portions of water. The ether was then evaporated, leaving nine grams of 1,2,3,4-tetrahydronaphthalene hydroperoxide which melted at 49–53° C.

*Example II*

A 1,2,3,4-tetrahydronaphthalene - 1,2,3,4 - tetrahydronaphthalene hydroperoxide mixture containing 7.5 percent of 1,2,3,4 - tetrahydronaphthalene hydroperoxide was pumped into a 48-inch long by one-inch inside diameter glass Scheibel column at a point four inches from the bottom, and ethylene glycol was admitted at a point four inches from the top. The pump rate in both cases was one liter per hour. Ethylene glycol extract was removed from the bottom of the column, and 1,2,3,4-tetrahydronaphthalene raffinate from the top. 1,2,3,4-tetrahydronaphthalene was the continuous phase. The system temperature was 26° C. When equilibrium was attained the 1,2,3,4-tetrahydronaphthalene raffinate contained 0.12 percent of 1,2,3,4-tetrahydronaphthalene hydroperoxide.

The glycol extract was extracted with isopropyl ether in the Scheibel column at the same conditions. All of the 1,2,3,4-tetrahydronaphthalene hydroperoxide was extracted into the ether phase; none remained in the glycol.

A total of 1197 grams of ether extract, containing 128 grams of 1,2,3,4-tetrahydronaphthalene hydroperoxide, was vacuum stripped to a kettle temperature of 67° C. and maintained at this temperature for one hour to insure the complete evaporation of the solvent. The oil remaining in the kettle was mixed with a small quantity of cyclohexane and the solution was cooled in a Dry Ice bath, whereby crystals of 1,2,3,4-tetrahydronaphthalene hydroperoxide precipitated. The crystals, after filtering from the solution and recrystallization from cyclohexane, amounted to 89 percent of the 1,2,3,4-tetrahydronaphthalene hydroperoxide charged to the kettle, at a purity of 89 percent. No attempt was made to recover 1,2,3,4-tetrahydronaphthalene hydroperoxide from the mother liquors.

What is claimed is:

1. The process for separating 1,2,3,4-tetrahydronaphthalene hydroperoxide from a mixture of 1,2,3,4-tetrahydronaphthalene and 1,2,3,4-tetrahydronaphthalene hydroperoxide which comprises contacting said mixture with a glycol selected from the group consisting of ethylene glycol, propylene glycol and diethylene glycol, the volume ratio of said glycol to said mixture being from about 0.5:1 to about 2.0:1.0, separating the resulting 1,2,3,4-tetrahydronaphthalene and glycol phases, contacting said glycol phase with an ether having the formula $R_2O$ wherein R is an alkyl radical having from 2 to about 4 carbon atoms, the volume ratio of said ether to said glycol phase being from about 0.5:1.0 to about 2.0:1.0 separating the resulting glycol and ether phases, contacting said ether phase with water, separating the resulting ether and aqueous phases at a kettle temperature of less than 65° C., distilling said ether phase and recovering as a bottom product 1,2,3,4-tetrahydronaphthalene hydroperoxide.

2. The process for separating 1,2,3,4-tetrahydronaphthalene hydroperoxide from a mixture of 1,2,3,4-tetrahydronaphthalene and 1,2,3,4-tetrahydronaphthalene hydroperoxide which comprises contacting said mixture with a glycol selected from the group consisting of ethylene glycol, propylene glycol and diethylene glycol, the volume ratio of said glycol to said mixture being from about 0.5:1 to about 2.0:1.0, separating the resulting glycol and 1,2,3,4-tetrahydronaphthalene phases, contacting said glycol phase with an organic solvent selected from the group consisting of aliphatic and cycloaliphatic hydrocarbons having from five to eight carbon atoms, separating the resulting glycol and organic solvent phases, contacting said glycol phase with an ether, having the formula $R_2O$ wherein R is an alkyl radical having from 2 to about 4 carbon atoms, the volume ratio of said ether to said glycol phase being about 0.5:1.0 to about 2.0:1.0, separating the resulting ether and glycol phases, contacting said ether phase with water, separating the resulting aqueous and ether phases, distilling said ether phase at a kettle temperature of less than 65° C., contacting the bottom product from said distillation with an organic solvent selected from the group consisting of aliphatic and cycloaliphatic hydrocarbons having from six to eight carbon atoms, and recovering as a product the resulting crystals of 1,2,3,4-tetrahydronaphthalene hydroperoxide.

3. The process for separating 1,2,3,4-tetrahydronaphthalene hydroperoxide from a mixture of 1,2,3,4-tetrahydronaphthalene and 1,2,3,4-tetrahydronaphthalene hydroperoxide which comprises contacting said mixture with ethylene glycol, the volume ratio of said glycol to said mixture being from about 0.5:1 to about 2.0:1.0, separating the resulting glycol and 1,2,3,4-tetrahydronaphthalene phases, contacting said glycol phase with cyclohexane, separating the resulting cyclohexane and glycol phases, contacting said glycol phase with isopropyl ether, the volume ratio of said ether to said glycol phase being from about 0.5:1.0 to about 2.0:1.0, separating the resulting glycol and ether phases, contacting said ether phase with water, separating the resulting acqueous and ether phases, distilling said ether phase at a kettle temperature of less than 65° C., contacting the bottoms product of said distillation with cyclohexane and recovering as a product the resulting crystals of 1,2,3,4-tetrahydronaphthalene hydroperoxide.

References Cited by the Examiner

UNITED STATES PATENTS

| | | | |
|---|---|---|---|
| 2,430,864 | 11/1947 | Farkas et al. | 260—610 |
| 2,511,957 | 6/1960 | Wickatz et al. | 260—610 |
| 3,102,918 | 9/1963 | Heise et al. | 260—610 |

FOREIGN PATENTS

| | | |
|---|---|---|
| 854,355 | 11/1960 | Great Britain. |

LEON ZITVER, *Primary Examiner.*